United States Patent [19]

Chur et al.

[11] 3,855,623

[45] Dec. 17, 1974

[54] MODULAR DISK MEMORY SYSTEM

[75] Inventors: Sung Pal Chur, Santa Clara; Leon H. Brown, Jr., San Jose, both of Calif.

[73] Assignee: Dataflux Corporation, Sunnyvale, Calif.

[22] Filed: Apr. 18, 1973

[21] Appl. No.: 352,216

Related U.S. Application Data

[63] Continuation-in-part of Ser. No. 126,484, March 22, 1971.

[52] U.S. Cl. .......................... 360/103

[51] Int. Cl. .......................... G11b 5/60

[58] Field of Search......... 340/174.1 B; 346/74 MD, 346/137; 179/100.2 P, 100.2 Z, 100.2 CA; 206/62 P; 274/4 H, 41.4 M; 360/102, 103

[56] References Cited

UNITED STATES PATENTS

| | | | |
|---|---|---|---|
| 3,368,210 | 2/1968 | Zimmer | 340/174.1 E |
| 3,416,150 | 12/1968 | Lindberg | 340/174.1 C |
| 3,553,663 | 1/1971 | Scholz | 340/174.1 C |
| 3,577,133 | 5/1971 | Garfein | 340/174.1 C |
| 3,593,327 | 7/1971 | Shill | 340/174.1 C |
| 3,609,722 | 9/1971 | Zenzetillis | 340/174.1 C |
| 3,651,501 | 3/1972 | Cote | 340/174.1 C |
| 3,662,360 | 5/1972 | Lambert | 340/174.1 C |
| 3,668,658 | 6/1972 | Flores | 340/174.1 C |
| 3,678,481 | 7/1972 | Daiziel | 340/174.1 C |
| 3,696,351 | 10/1972 | Groom | 340/174.1 C |

*Primary Examiner*—Vincent P. Canney
*Attorney, Agent, or Firm*—Fraser and Bogucki

[57] ABSTRACT

A modular disk memory system is arranged such that each of plural disk and head modules contains all operative elements in a head per track configuration of low profile. Each module contains at least one magnetic disk which rotates within a cylindrical shell comprising mating members having a central vertical shaft, driven by a belt from the associated frame structure. Each module also includes modular magnetic head assemblies that are radially insertable through the cylindrical shell to provide a head per track configuration. One or more rotatable elements on opposite sides of the cylindrical shell support and control th head assemblies, which are pluggable into centrally disposed circuits coupled to the systems electronics. The disk and head modules may be added or changed at will to provide a storage capacity compatible with given usage and cost requirements.

34 Claims, 19 Drawing Figures

INVENTORS

SUNG PAL CHUR
LEON H. BROWN, JR.

INVENTORS
SUNG PAL CHUR
LEON H. BROWN, JR.

PATENTED DEC 17 1974 3,855,623

SHEET 03 OF 11

*INVENTORS*
SUNG PAL CHUR
LEON H. BROWN, JR.

INVENTORS
SUNG PAL CHUR
LEON H. BROWN, JR.

INVENTORS
SUNG PAL CHUR
LEON H. BROWN, JR.

*INVENTORS*
SUNG PAL CHUR
LEON H. BROWN, JR.

*INVENTORS*
SUNG PAL CHUR
LEON H. BROWN, JR.

MODULAR DISK MEMORY SYSTEM

CROSS REFERENCE TO RELATED APPLICATION

This application is a Continuation-in-Part of application Ser. No. 126,484, in the name of Sung Pal Chur and Leon H. Brown, Jr., filed Mar. 22, 1971, entitled MODULAR DISK MEMORY SYSTEM, and now abandoned.

BACKGROUND OF THE INVENTION

1. Field of the Invention

This invention relates to magnetic disk systems, and more particularly to head per track disk file systems.

2. History of the Prior Art

The magnetic disk art for digital data handling is now highly developed and a wide variety of recording and reproduction systems are now in use. In the movable arm type of system, one or more servo controlled arms for each side of a recording disk are mounted outside the periphery of a disk, and move rectilinearly along a radius to a selected track position. The access time in such systems is determined by the time required for the arm to access to and settle on a given track or tracks, plus the time needed for a selected record to rotate to the head position.

Shorter access time is provided by disk file systems using a head per track arrangement, in which there is at least one head for each track, with multi-channel heads typically being spaced at different circumferential positions about the disk. The access time for a head per track system is significantly shorter than with movable arm systems, being essentially only the time required for the selected record to reach the associated recording/reproducing head.

In order to increase the speed and capacity of disk memory systems, highly precise mechanisms have been evolved. The recording disk is typically precision manufactured to have very close tolerances in terms of flatness (runout) and magnetic properties, and is mounted so as to be rotatable with very little eccentricity. Provision is often included for interchanging disks, considerably increasing the problems of achieving error free data transfer. The disks are coated or plated to have a very precise depth of recording surface for use at high speeds of rotation, such as 1,800–6,000 rpm, and at high recording densities, such as 1,600 bpi to 4,000 bpi. A precise juxtaposition of the individual magnetic head assemblies to the recording surface of the disk is required, and "flying head" assemblies are now predominantly used that ride on the air film adjacent the disk at a few microns spacing therefrom. These flying head assemblies typically have a ceramic or other hardened air bearing pad or shoe in which the air gaps of a multiple head assembly are disposed flush with the air bearing surface.

The general tendency in the disk recording field has been, with certain exceptions, to achieve what is called "IBM compatibility" by utilizing one of a number of virtually standard configurations. For example, most disk files in use today have movable access arms, and utilize one, two, six or eleven disks on a common shaft. A number of head per track systems are known, also utilizing one or more disks on a common shaft that comprises the drive shaft of the associated motor. Typically, a bulky frame structure is used to which flying head assemblies, the associated drive motor and associated control units are more or less permanently attached, access being gained by the use of hinged structures.

The systems of the prior art have notable limitations in terms of their versatility for matching a desired storage capacity and cost to a user's requirements. The system user who has a single disk system and desired to double his disk storage capacity typically purchases another disk file system, with an attendant need for interfacing electronics, which can be considerable in some data processing systems. In the vast majority of installations, however, this results in a substantial wastage of capability, inasmuch as the processor cannot operate both disk files simultaneously.

An extremely important operative consideration also relates to the occurrence of catastrophic conditions, popularly labeled "head crash". Control mechanisms are needed for the flying head assemblies, so as to insure that the heads do not contact the disks during high speed operation. Because of the tolerances involved, however, head to disk contact can occur, arising from rotational instability, dust particles in the head to disk space, loss of disk speed due to power failure, and a number of other causes. When head crash does occur, the enclosed chamber can be virtually filled with abrasive oxide dust from the recording disk, and extensive damage can result from broken parts and mechanisms.

In order to minimize these problems further, the control systems for the flying head assemblies typically are arranged in fail-safe fashion, to urge the head assemblies to ride against the air films only when the disk speed is in excess of a controlled amount. Typically, structures mounted in a fixed frame or substantially fixed elements have been utilized for this purpose. In addition, often complex bearing and support arrangements for the disk drive shafts have been utilized. These factors have prevented expansion of the disk file systems, or modification of the capability of such systems. In order to incorporate additional magnetic head assemblies in a head per track system, so as to decrease the access time by half, most prior art systems have had to be significantly redesigned. Insertion and replacement of the magnetic head assemblies typically has involved essentially permanent mountings. The units incorporating all these features are therefore complex, heavy and cumbersome systems. When a head crash or other failure occurs, therefore, the entire unit must be returned to a precision facility for repair, although this is inconvenient and costly because of the weight and bulk involved.

Further problems arise in terms of the time required to record or otherwise enter data on a disk. For example in most prior art systems it has become necessary to interrupt data processing operations for substantial periods of time while a new program or set of instructions is recorded on the disk. Accordingly it is desirable to be able to replace programs and other data much more quickly than is possible when the new data must be recorded on the disk.

SUMMARY OF THE INVENTION

The objects and purposes of the present invention are achieved by a modular construction of individual disk files, based upon independent self-contained low profile cell structures incorporating an externally accessible central drive shaft. Support frame and head mounting structures comprising principally disklike and coextensive elements are disposed within this system. Individual head modules supporting one or more flying head assemblies are radially insertable into the frame and coupled to associated system electronics. The drive shaft for the individual module is driven by a belt from a spaced apart motor on the frame system. In one example of a modular system, pairs of slidably insertable modules are disposed in superposed relation in a carrier frame that is received within any receptacle in a standard mounting rack. A single double-shaft motor is used for belt drive of both modules, which plug into common electronics in the mounting rack. Individual modules may be added or replaced to adjust system size and capacity to the current needs of a user.

In a specific example of a disk file module in accordance with the invention, a pair of disks are mounted on a common central shaft, with a small air gap between them serving to damp rotational resonances. A pair of essentially planar wheel members, each having a central hub, an outer peripheral annulus and a number of radial interconnecting arms, are mounted to encompass the disks and form a low profile cylindrical shell. Upper and lower head mounts and head control disks each comprise annular structures that are mounted within the shell on the outer sides thereof. A selected number of head modules, each supporting a pair of flying head assemblies, are radially insertable through circumferential apertures in the cylindrical shell within guideways into fixed operative position relative to the disks. When the modules are inserted, the head assemblies thereof are connected to printed circuit board disks mounted about the central shaft and coupled to the system electronics. The flying head assemblies are also then in position with camming mechanisms that are in association with the adjacent head mounting disks, and controlled by circumferential rotation of the adjacent head retracting disks, upper or lower. When the disks are up to speed, the head retracting disks are rotated through a selected angle, operating the camming mechanisms to urge load button elements into contact with the head pad assemblies, and urging the head pad assemblies toward the interposed air film with the force needed for establishment of the desired head to disk spacing.

A feature of systems in accordance with the invention is the provision of a low profile, relatively lightweight but mechanically stable module. The spoked wheel members, annular mounting and control mechanisms are compact yet readily fabricated. Head control mechanisms comprising slidable cam members controlling attached spring loading members are shifted circumferentially to move the head pads into operative position. A fail-safe arrangement is provided that operates the head control smoothly in the air bearing directly, but releases quickly in the event of power failure.

Another aspect of the invention lies in the provision of an improved, detachable, air bearing head module. The head pads are resiliently supported in a frame, and the head circuits are interconnected to a connector that is on the inserted end of the frame. Signal connections to the circuits are made through some of the resilient elements. Loading button mechanisms on the frame are operable by external mechanisms but are a part of the module.

In a further specific example of a disk file module in accordance with the invention a central shaft having a disk mounted thereon is mounted for rotation within a low profile cylindrical shell formed by essentially planar members, one of which also serves as a base plate for the module. First and second sets of head modules are radially insertable into the cylindrical shell within guideways into fixed operative positions between opposite sides of the disk and different ones of the planar members. Adjacent pairs of head modules from the first and second sets have engaged gears coupled to camming mechanisms within the head modules for raising and lowering the flying head assemblies as the gears are rotated. Rotation of the gears to raise and lower the head assemblies is controlled by a motor driven ring rotatably mounted on the top of the cylindrical shell and having toothed portions which engage the gears from the first set of head modules. A battery driven motor which is coupled through a plurality of gears to rotate the ring includes switches responsive to the gears for turning the motor off whenever the head assemblies reach either of the opposite positions as determined by the rotational positions of the gears.

BRIEF DESCRIPTION OF THE DRAWINGS

A better understanding of the invention may be had by reference to the following description, taken in conjunction with the accompanying drawings, in which.

DETAILED DESCRIPTION

Figures 1, 2:
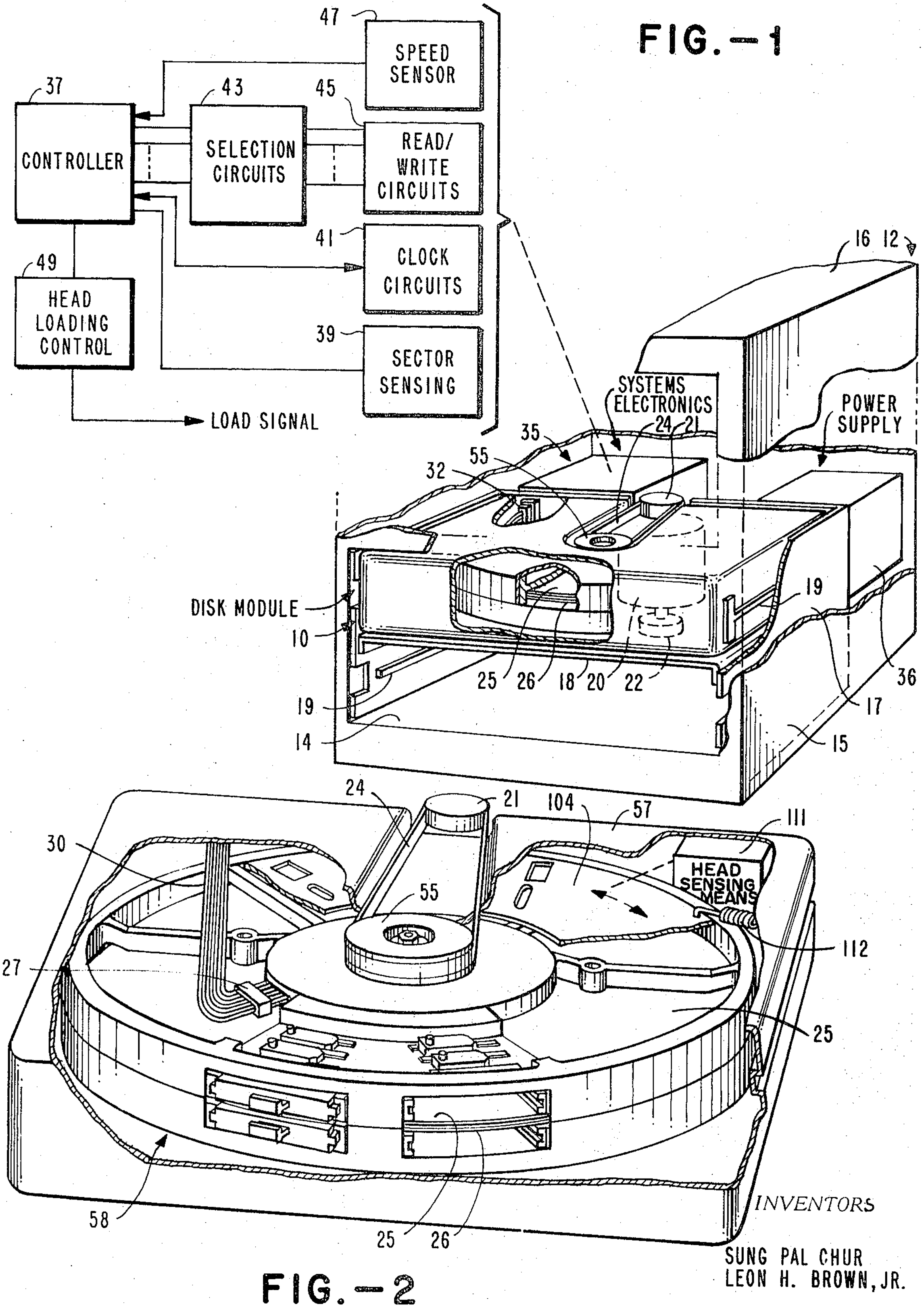
FIG. 1 is a simplified perspective representation, partially broken away, of a modular disk file system in accordance with the invention.
FIG. 2 is a fragmentary perspective view, partially broken away, of a disk file module in accordance with the invention.

A typical modular construction in accordance with the invention, referring now to FIG. 1 disposes individual modules 10 at different vertical superposed positions relative to a frame structure, such as a standard electronics rack 12, having a base 14, upstanding sides 15, and a top 16. A module carrier 17 having a center divider 18 and front to back guideways 19 on each side separates each receptacle of the rack 12 into two module-receiving halves. A motor 20 (shown in dotted outline) mounted on the back of the carrier 17 as by brackets has a double ended shaft supporting drive pulleys 21, 22 at opposite ends thereof. A drive belt 24 is coupled to each drive pulley, e.g., the pulley 21 aligned with the module 10 that is shown. A pair of magnetic record disks 25, 26 are approximately centrally mounted in the module 10, to rotate in a plane normal to the rotational axis of the motor 20.

A plug connector 24 (FIG. 2) at the center of a module 10 is coupled to internal signal lines 30 that connect to a rear wall connector 32 that couples into systems electronics 35 positioned in the rear of the rack 12. The principal units of the systems electronics 35 have been shown only in block diagram form, inasmuch as any of a number of conventional systems may be employed. A power supply 36 for the circuits and motor 20 is also positioned in the rear of the rack 12 and is automatically engaged by connector means (not shown) when the module 10 is inserted. As in many existing systems, the systems electronics 35 includes a controller 37, sector sensing circuits 39, and clock circuits 41. The sector sensing and clock circuits 39, 41 are utilized with each of the modules 10. Selection and read/write circuits 43, 45, respectively, are also employed, these being coupled through the controller 37 and associated interface circuits to any associated data processor (not shown). Also a portion of the systems electronics, although these may be mounted at least partially internally in the modules 10, are speed sensor mechanisms 47 responsive to the speed of an individual disk, and a head loading control mechanism 49.

Each module 10 is therefore slidably mountable into a slot of similar shape and slightly larger size comprising one half of the carrier 17 in the frame 12, on the guideways 19, onto its operative position in which electrical connections are made. A driven pulley 55 protrudes from the internal drive shaft of the module 10 to be engaged by the drive belt 24, and the drive belt 24 is thus readily slipped on.

In the example shown in FIG. 1, the single inserted module 10 is constantly driven at a selected speed, such as 2,400 rpm, by the motor 20, the speed being determined not only by the motor speed but by the ratio between the drive and driven pulleys 21, 55. A relatively small (e.g., one-third horsepower) synchronous motor is suitable for this drive application. Operation of the few control functions and system electronics may be carried out in any of the various commercial head per track systems now in use. Specifically, command and data signals to and from a data processor (not shown), such as a conventional commercially available computer, are coupled to the controller 37 which responds to these signals to provide appropriate response signals to the data processor, as required for interfacing by that processor, and to provide selection of the appropriate recording track of the module, and operation in the read or write mode. In this particular example, only a single track is selected at a particular time for reading or writing. During these operations, the controller 37 is required to locate the relative position of a desired record on a track, this being effected by sector sensing circuits 39 in conjunction with clock circuits 41, for each module 10. Separate circuits 39, 41 are utilized for each module because dimensional differences in the pulley systems may result in speed variations between the different modules. Details of such systems have not been shown, inasmuch as a wide variety of expedients are presently known, including principally individual clock tracks on the disks together with associated distinguishing sector marks.

The systems electronics 35 also includes the speed sensor mechanism 47, which may be mechanical or electronic, and the head loading control 49 for providing appropriate signals to urge the heads toward their operative position close to the record member when the associated disk is up to speed. One conventional way of speed sensing is to determine whether the rate of the clock pulses is in excess of a selected rate, and the head loading control then provides an engaged control signal as long as this condition exists.

A specific example of an advantageous modular construction is shown in FIGS. 2–5, to which reference is now made. A module housing 57 encompasses a low profile cylindrical shell 58 (FIG. 2 only) that supports a central (typically vertical) drive shaft 59 in upper and lower bearings 61, 63 respectively, best seen in FIGS. 4 and 5. A disk hub 65 on the shaft 59 is arranged to receive a pair of recording disks 25, 26 on opposite sides thereof. A pair of annular flat disk clamps 73, 74 respectively engage the internal peripheries of the disks 25, 26 at the opposite sides thereof and secure these in precise relation to the disk hub 65 in conventional fashion.

The upper and lower bearings 61, 63 for the shaft 59 are seated in central apertures within upper and lower spoked wheel members 76, 77 respectively that form the cylindrical shell 58. Only the upper spoked wheel member 76 is herein described in detail, relative to FIG. 4, inasmuch as the members 76, 77 are effectively identical but inverted. The upper wheel member 76 includes a central disk hub 81 of general planar configuration for receiving the upper bearing 61, from which hub spoke arms 83 extend radially to a peripheral rim 86. Peripheral openings 86 in the rim 85 between the spokes 83 permit access radially into the interior portion of the member 76. The spokes 83 are angled slightly at each end toward the central region of the shell 58, and when fitted together the rims 85 of the wheel members 76, 77 define the cylindrical shell 59.

Figure 4:
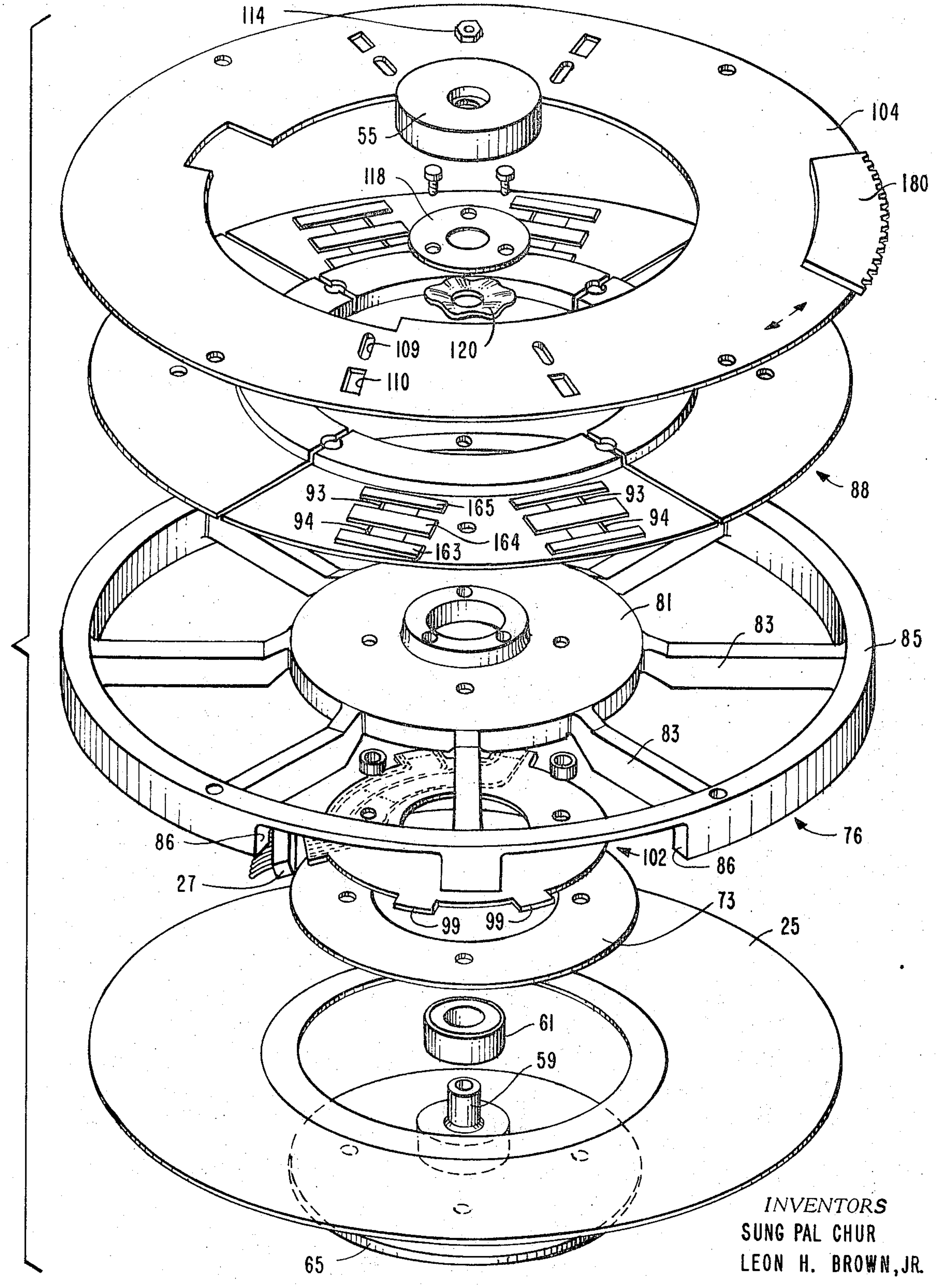
FIG. 4 is an exploded perspective view of the principal operative internal elements in approximately the upper half of the module of FIG. 2.
Figure 5:
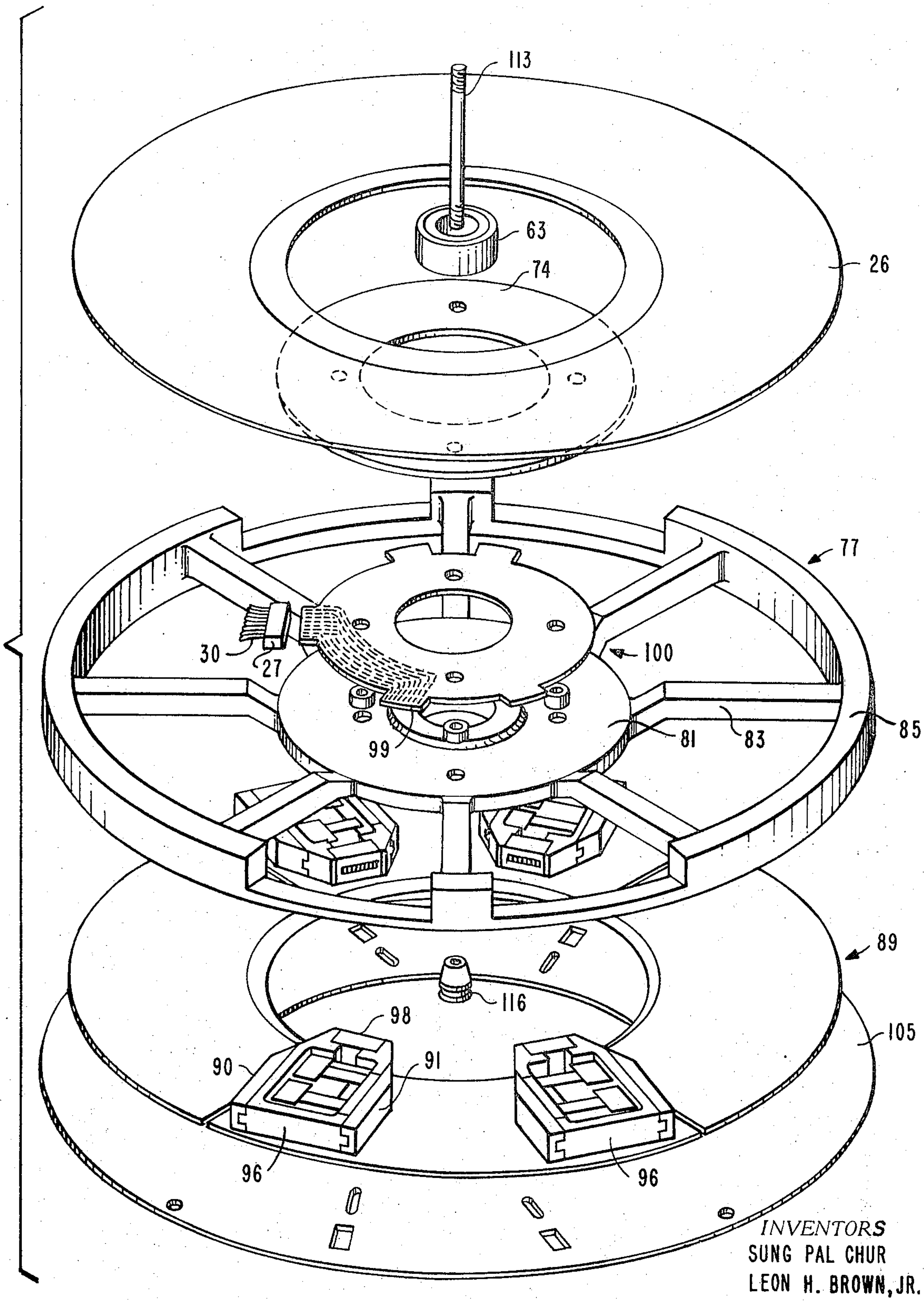
FIG. 5 is an exploded perspective view of the principal operative internal elements in approximately the lower half of the module of FIG. 2.
Figure 6:
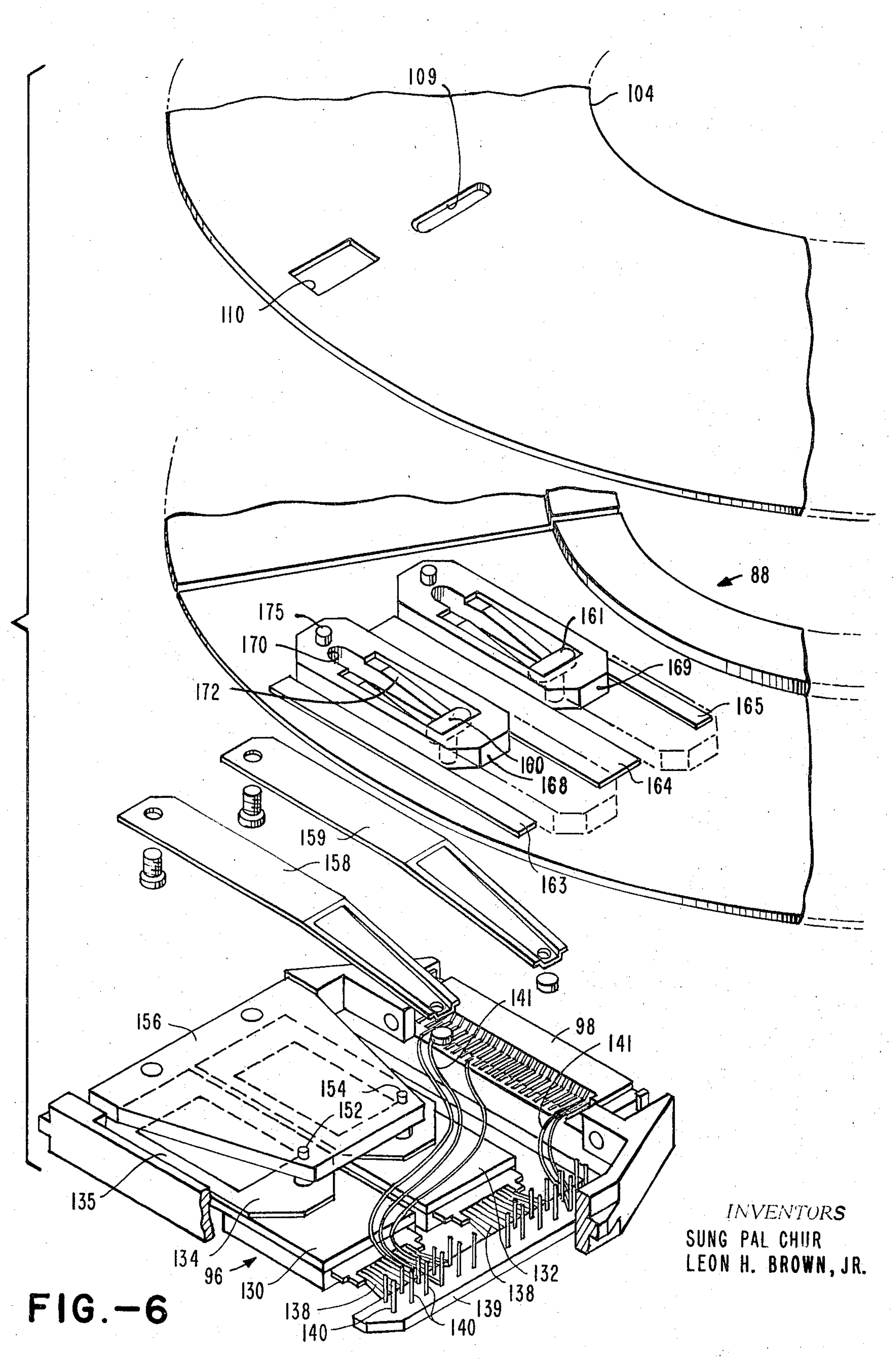
FIG. 6 is an exploded fragmentary perspective representation of the principal elements in a head mounting module and the associated control mechanism.
Figure 7:
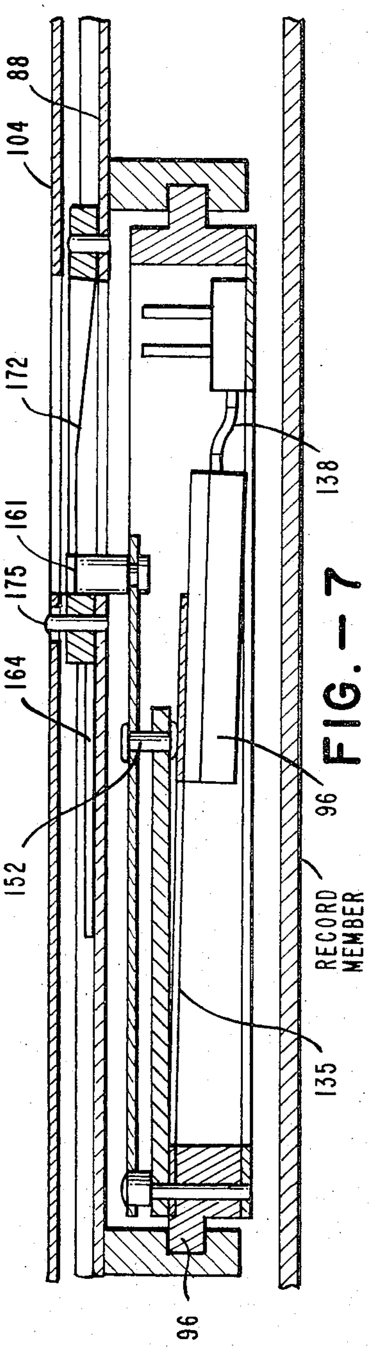
FIG. 7 is a sectional assembly view of a portion of the arrangement of FIG. 6.
Figure 8:
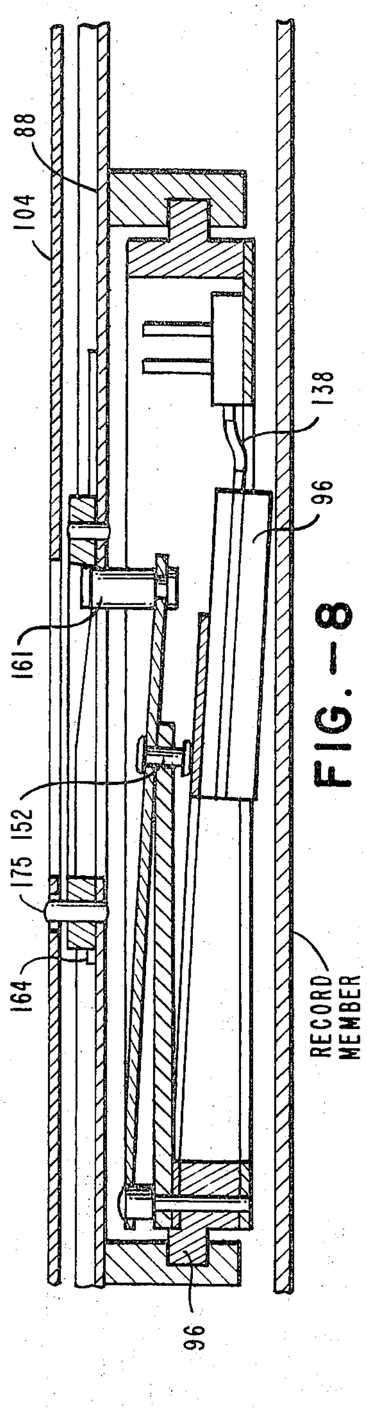
FIG. 8 is a fragmentary sectional view of another portion of the arrangement of FIG. 6.

An essentially flat upper head mounting disk means 88 and a lower head mounting disk means 89, each comprising four arcuate segments, are mounted against the upper and lower sides of the upper and lower wheel members 76, 77 respectively. Each segment fits across two adjacent pairs of spokes 83. Eight equal arcs are defined between the spokes 83. As best seen in FIG. 5 relative to the upper side of the lower mounting disk means 89, left and right guide elements 90, 91 define separate head module positions. The guide elements 90, 91 are parallel to a radius on the disk means 89, and span an interposed pair of apertures 93, 94 (FIG. 4) through which the individual head pads may be engaged by a control mechanism, as described below. An individual head module 96 shown in FIG. 5 and described in detail below in conjunction with FIGS. 6–8 is slidably insertable in each pair of guides 90, 91.

As best seen in FIGS. 2 and 5, when inserted, a leading edge multi-pin female connector 98 plugs into a male connector 99 extending radially from a central plate comprising a printed circuit board forming a head lead buss 100. External circuit connections are made between the central plate 100 and associated circuit elements via the main plug connector 27, signal conductors 30 and output connector 32. A similar head lead buss 102 (FIG. 4) is mounted on the opposite side of the upper frame 76 from the heads (not shown in FIG. 4) on the upper head mounting disk means 88 and similarly interconnected.

Four head modules 96 are disposed on each side of a disk 25 or 26, each having a pair of air bearing head pads with a selected interior loading point. Each head pad includes a multi-channel recording/reproducing head assembly within the air bearing structure. The heads are loaded when an external force of predetermined magnitude acts against them to urge them toward contact with the air film on the high speed disk.

The air bearing head pads on the head modules are controlled by upper and lower head control disks 104, 105 respectively, on the opposite outer sides of the head mounting disks 88, 89 respectively. As best seen in FIG. 4 relative to the upper head control disk 104 a number of pairs of pin apertures 109, 110 are disposed at different radial positions corresponding to each head assembly pair.

As shown only in general form in FIG. 2, in conjunction with the upper head retracting disk 104, a head shifting mechanism 111 is coupled to the upper head retracting disk 104, to provide a limited arc of circumferential movement of that disk 104 when actuated by the head loading control circuits 49 (FIG. 1) for head engagement. This mechanism 111 may be coupled to control both head control disks 104, 105 as shown below in the specific example of FIG. 11. A spring 112 is coupled to urge the head retracting disk 104 in the opposite position, so as to hold or return to a given start position when no power is applied or power fails.

As seen in FIGS. 4 and 5, the driven pulley 55 is already coupled to the upper end of the shaft 59, being threadedly engaged to a central retaining rod 113, secured at its upper end by a nut 114 adjacent the drive pulley 55, and its lower end by a pulley locknut 116. A bearing retainer 118 secured to the upper frame 76 is held against the drive pulley 55 by a bearing preload spring 120, that acts against the outer race of the upper bearing 61.

The associated recording surface for the modules 96 shown in FIG. 5 is the lower surface of the lower recording disk 26. Sixty-four transversely disposed tracks on a disk face are provided by this arrangement, with each multihead unit comprising only flying head assembly providing eight recording tracks, so that the pair of head assemblies employed with each module 96 provide sixteen tracks per module. The sixteen heads in the circumferentially opposite module 96 to a given first module are arranged to provide interleaved tracks relative to the first module, so that both together cover one half of the available record surface. The remaining assemblies in two modules 96 similarly provide coverage of the remaining section of the disk. This usage of interleaved tracks between separate individual heads in each multi-head assembly permits the heads to be more widely spaced, reducing signal cross-talk between heads and tracks.

The pin apertures 109, 110, best seen in FIGS. 4 and 5, engage camming and head loading structure that is not shown in FIGS. 4 and 5, but is described in detail in conjunction with FIGS. 6–8 below. At this point it suffices to state that the circumferential shifting movement of the head control disk is effective to load the heads.

In the operation of the modular disk file arrangement of FIGS. 2–5, the head modules 96 are inserted in operative position through the apertures 86 in the peripheral rim 85 of the cylindrical shell 58. The module 10 is inserted in the guideways 19 of the carrier 17 of FIG. 1, and the drive belt 24 is slipped on the drive pulley 21 of the motor 20 and the driven pulley 55 of the module 10. If another module (not shown) is to be mounted under the module on the carrier 17, then the drive pulley 22 at the lower end of the motor 20 is engaged by a drive belt in similar fashion. Signal interconnections are made at the connector 32 to the systems electronics and at the power supply 36. The motor 20 is then energized and the disks 25, 26 are brought up to speed. As the desired speed range is approached, the external control circuits 49, FIG. 1, energize the head shifting mechanism 111 of FIG. 2, so as to load the head assemblies into operative relation with the disks 25, 26. The system is thereafter operated in conventional fashion, with one recording track being selected for recording or reproduction of signals, in conjunction with given records on the disk. Selection of a given record and sector position is effected by the controller 37 together with any associated data processor, in conventional fashion.

The entire module 10 may be disengaged simply by removal of the electrical couplings and mechanical disengagement of the drive belt 24, followed by extraction of the module 10. All of the internal elements are thereafter safely retained out of operative relationship, so that no wear or impact occurs, and the module 10 may be readily handled manually and shipped by air or other expedited transportation at low cost. In the event of head crash or other catastrophic failure, only the internal mechanism of the module is affected, and because this comprises only removable head modules, and standardized elements for the upper and lower recording surfaces, the various parts may be readily disassembled, inspected and replaced. In the meantime, a similar module may be utilized without excessive down time, by the operator at the installation.

Modular constructions in accordance with the invention have significant operative, mechanical and cost advantages over prior art head per track systems. The compact, low profile cylindrical shell construction permits the modules to be readily handled by an individual, even though the recording disks 25, 26 are completely encompassed by a short length, low profile structure, and therefore protected. The housing 57 may be coupled to an air filtering system, if desired and provide enclosed operation. The short length and compact structure along the shaft, and the relatively close placement of the bearings for the shaft, permits the rotational system to operate with a minimum of eccentricity. In addition, no complex bearing or adjustment systems need be employed to distribute load or assure alignment. The employment of two closely spaced disks 25, 26 is not necessary, but provides damping of resonances, if they exist, in an extremely simple fashion. The thin layer of air between the disks 25, 26 provides this damping mechanism, so that the unit can be run at a lower or higher speed than the 1,800 rpm example given without encountering the undesirable resonances that are often found in such systems.

It will be appreciated by those skilled in the art that although only four head modules per recording side have been shown, the arrangement is readily expandible to double that number, so as to utilize two circumferentially opposite heads for each track and reduce the access time by approximately one-half. With respect to FIGS. 4 and 5, for example, it will be recognized that the segments of the head mounting disk means 88, 89 that receive head modules 96, can be used for all four segments, so that the head modules fit between the spokes 83 of the wheel members 85, 86, with the head control disks 104, 105 incorporating four extra pin apertures 109, 110, in similar fashion, and with the head lead busses 100, 102 also being modified to incorporate the additional circuitry.

Figure 3:
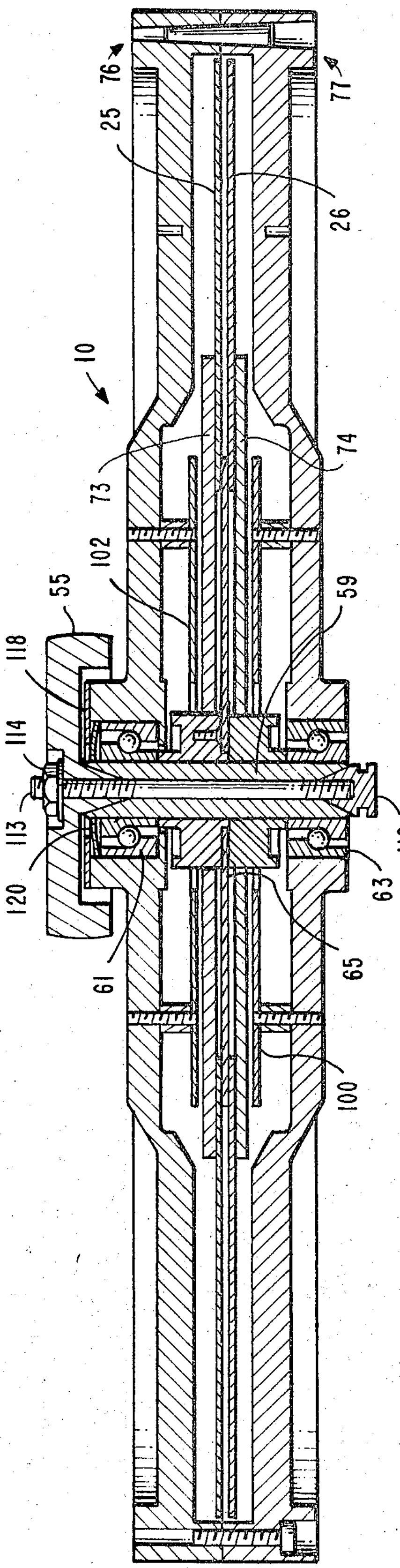
FIG. 3 is a cross sectional view of the module of FIG. 2.

As will be seen from FIGS. 3–5 particularly, the extremely compact arrangement is made feasible by virtue of the relationship of the abutting wheel members 85, 86, together with the head mounting disk means 88, the segments of which fit into the outer depressions formed by the slightly non-linear spokes 83, with the head control disks 104, 105 being only slightly separated from the head mounting disk means. Means for fastening the structure together have been shown generally in the drawings, but need not be described in detail. It will also be noted that the central intercoupling of the signals to and from the head modules, at the head lead busses 100, 102 and the direct intercoupling from the central region to the rear of the module 10, provides a short conductive path length so that a high signal to noise ratio is maintained.

FIGS. 6–8 illustrate in greater detail the construction and operation of the head module 96 and the head loading control mechanism. The head module 96 comprises principally a generally rectangular frame with side elements and a bayonet type multi-terminal female connector 98 at its inserted end, which tapers slightly. A pair of head pad assemblies 130, 132 each comprise a flying head structure and have in this instance nine individual parallel magnetic heads, eight being used for recording and reproduction in the normal instance with one being available as a spare. A planar, generally rectangular spring element 134 is used for each of the head pads, such as the head pad 130. This spring element comprises a pair of elongated spring arms 135, mounted at one end to a part of the module frame, and coupled at the other end to the head pad 130. The spring arms 135 normally urge and hold the head pads 130, 132 away from the associated record surface with a predetermined spring force. A central mechanical loading point on the head pad 130 (here the upper side) serves as the point at which forces are exerted to urge the pad 130 toward the associated recording surface.

Figure 9:
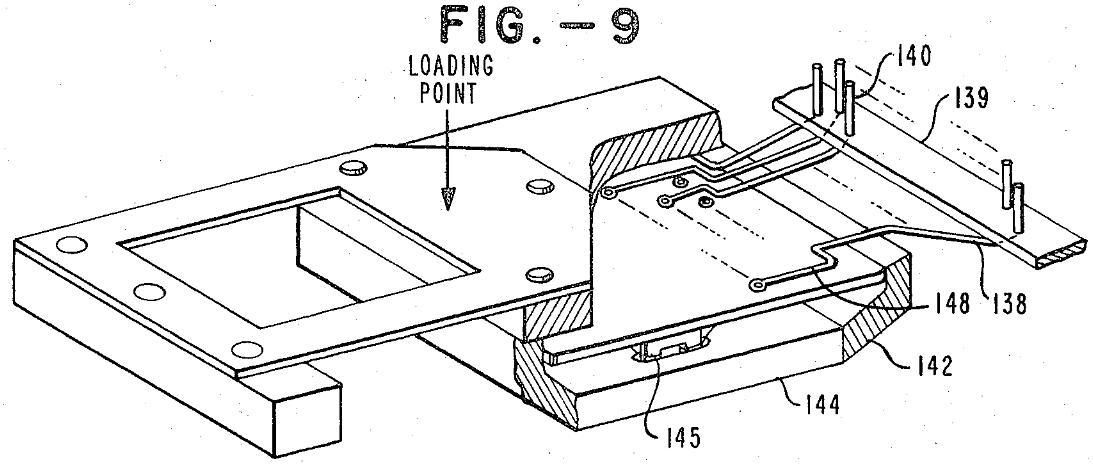
FIG. 9 is a perspective view of a portion of the arrangement of FIG. 6.

Signal connections are made to the interior magnetic heads by a fret assembly 136, best seen in partially exploded form in FIG. 6. A number of individual, thin resilient conductors 138 of conductive material such as beryllium copper are coupled at one end to a base member 139 and electrically coupled to individual connector pins 140, with wire wrap or other conductors 141 interconnecting these lines to the plug-in connector 98. The individual connectors 138 in the fret assembly 136 are coupled to the individual windings in the magnetic head assembly in conventional fashion. The individual elements of the fret assembly 136, and the manner of their interconnection to associated circuit elements, may be seen more clearly with reference to FIGS. 9 and 10. The head pad is supported within a small plastic shield 142 of generally rectangular outline. The air bearing member 144 comprises a ceramic pad facing the associated recording surface, in which slots are disposed for receiving the individual heads 145 in the multi-channel head assembly. The heads may be affixed both to the air bearing pad and to a printed circuit board base 147 mounted in the shield 142. Printed circuit connectors 148 on the opposite side of the printed circuit board 147 from the heads 145 provide signal interconnections (soldered or welded or otherwise affixed) to the fret connectors 138. On the same side as the head assembly, selection diodes 149 and conductors coupling the diodes and printed circuit board to the windings 150 of the magnetic heads 145 are shown only in general form.

Flying head assemblies in accordance with the present invention are extremely compact and yet suitably rugged and reliable for long term use. The flexible resilient conductor arrangement that is coupled to the internal circuitry greatly simplifies production, assembly and usage. In addition, the individual head pads can be handled within the modules 96 without adverse affect on their operative or mechanical properties.

Returning to FIGS. 6–8, individual load buttons 152, 154 act against the load points of individual head pads 130, 132 respectively. These load buttons 152, 154 are slidably movable in a normal direction relative to the head pads in apertures in a load button guide plate 156 affixed to one side of the module frame 96. The opposite ends of the load buttons 140, 142 from the head pads 130, 132 are engaged by head loading springs 158, 159 respectively, mounted on the underside (as seen in FIG. 6) of the head mounting disk means 88 at the apertures 93, 94 (FIG. 4). T-shaped head control pins 160, 161 extending through the disk means 88 are engaged to the free ends of the head loading springs 158, 159 respectively. The control pins 160, 161 form part of movable camming mechanisms on the disk means 88. The upper surface of the disk means 88 contains three-spaced longitudinal ridges 163, 164, 165 positioned normal to a radius from the central axis of the structure. Relatively flat cam members 168, 169 are slidably movable in the spaces between the elements 163 to 165. Each of the cam members includes a central slot 170 through which the control pin 160 or 161 protrudes for securement to the associated spring 158 or 159. An inclined cam surface 172 rests against the underside of the T-shaped cross arm of the control pin 160, controlling the height of the pin 160, and therefore the height of the associated spring 158 or 159, dependent upon the shifting of the member 168 in the track in which it rides. Control of this shifting is effected from the control disk 104 by the aperture, such as the aperture 110 engaging an extending pin 175 at one end of the member 168.

As best seen in FIG. 6, the apertures 109, 110 are at an angle relative to a true radius of the control disk 104, in order to provide a linear motion of the associated camming member 168 or 169, as the disk is moved through a limited circumferential arc.

The operation of the mechanism will be best appreciated with respect to the two different operative positions shown in FIGS. 7 and 8, with respect to the exploded view of FIG. 6. In the disengaged position of the head pads 130, 132, the control disk 104 is moved to its clockwise limit of motion, so that the apertures 109, 110 bring the pins 175 and the associated slidable members 168, 169 to their clockwise limit of movement, bringing the control pins 160, 161 up to the high end of the cam surface 172, in turn drawing the springs 158, 159 away from the head loading pins 152, 154. Thus pressure on the head loading pins 152, 154 is released and the normal spring tension in the arms 135 takes the head pads 130, 132 away from the air bearing position. Movement of the control disk 104 in the counter-clockwise direction, however, shifts the members 168, 169 back along the guide tracks in the generally counter-clockwise direction, causing the control pins 160, 161 to ride down on the cam surfaces, and permitting the loading springs 158, 159 to bear against the loading pins. The force exerted on the loading pins tending to urge the head pads 130, 132 toward the recording surface is a predetermined force established by the spring force, and therefore constant and predictable. It will also be observed that this operation of the head loading mechanism is effected with low profile, closely related elements that do not interfere with the modular construction, but are nevertheless readily fabricated. In addition, none of the mechanism causes interference with removal or insertion of the head modules 96.

Figure 11:
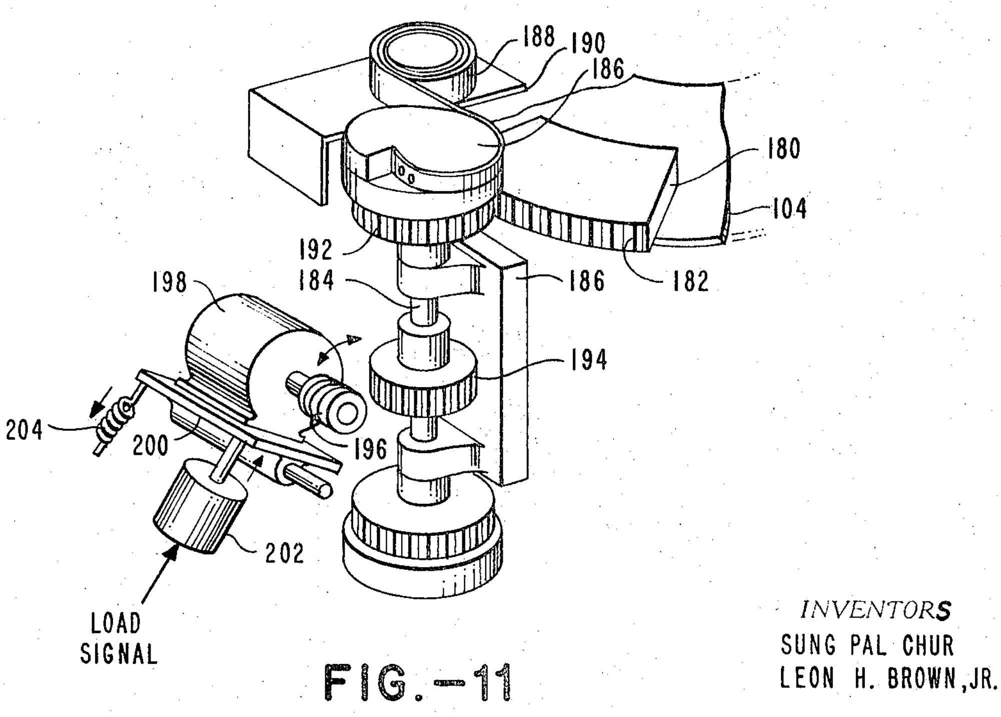
FIG. 11 is a perspective view of a fragment of the system, showing a preferred head control actuating mechanism.

A specific example of an actuator for the head control mechanism is shown in FIG. 11, to which reference is now made. Only a fragment of the system concerned with the operation of a head control disk 104 is shown in this arrangement. A small arc segment 180 having peripheral gear teeth 182 is mounted concentric with a portion of the periphery of the head control disk 104. A drive shaft 184 is mounted in bearings supported on a bracket 186 that is fixed relative to the mechanism, the shaft lying substantially normal to the plane of the head control disk 104. At each end, the shaft terminates in a hub 186 to which a spring, such as a negator spring 188 mounted on a fixed bracket 190 is attached, a gear 192 concentric with the shaft 184 and affixed to the hub 186, meshing with the peripheral gear 182 on the circumferential arc segment. Therefore, the spring 188 tends to rotate the head disk 104 in the counter-clockwise direction as seen in FIG. 11. It will be noted that this is the stable, or unloaded, position of the mechanism, and is opposite to the relationship illustrated and discussed in FIG. 6, for purposes of convenience.

A central gear 194 from the shaft 184 is selectively engageable by a worm gear 196 mounted concentrically with the shaft of a motor 198. The motor is mounted on rotatable bracket 200, one end of which is engaged by a linear solenoid 202 and the other end of which is engaged by a spring 204. When the solenoid 202 is energized by a load signal for the head pad mechanisms, the bracket 200 is pivoted, engaging the work gear 196 to the driven gear 194 on the shaft 184. Concurrently, an energization signal is applied to the motor 198, causing the shaft 184 to be rotated so as to rotate the disk 104 in the clockwise direction through a selected distance. A symmetrical arrangement is employed, in that the single motor 198 also drives the lower head control disk 105 through a similar spring and gear arrangement (not shown in detail). The mechanism is advantageous in providing a smooth control of the circumferential shifting of the head disk 104 when engaged. The motor may be energized by a selected voltage, or otherwise controlled depending on the desired motor type, so as to accelerate at a controlled rate. Thus the head pads are not urged abruptly toward the associated recording surfaces, but may be urged against the air film in a smooth and controllable fashion.

Figure 12:
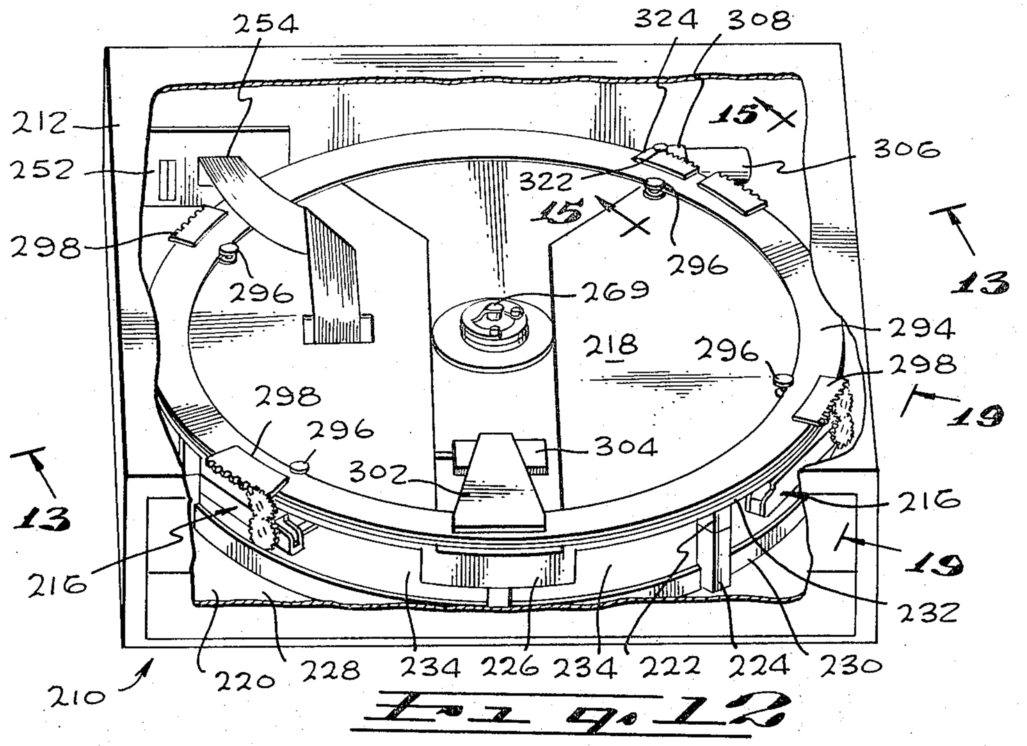
FIG. 12 is a fragmentary perspective view, partially broken away, of a different embodiment of a disk file module in accordance with the invention.
Figure 13:
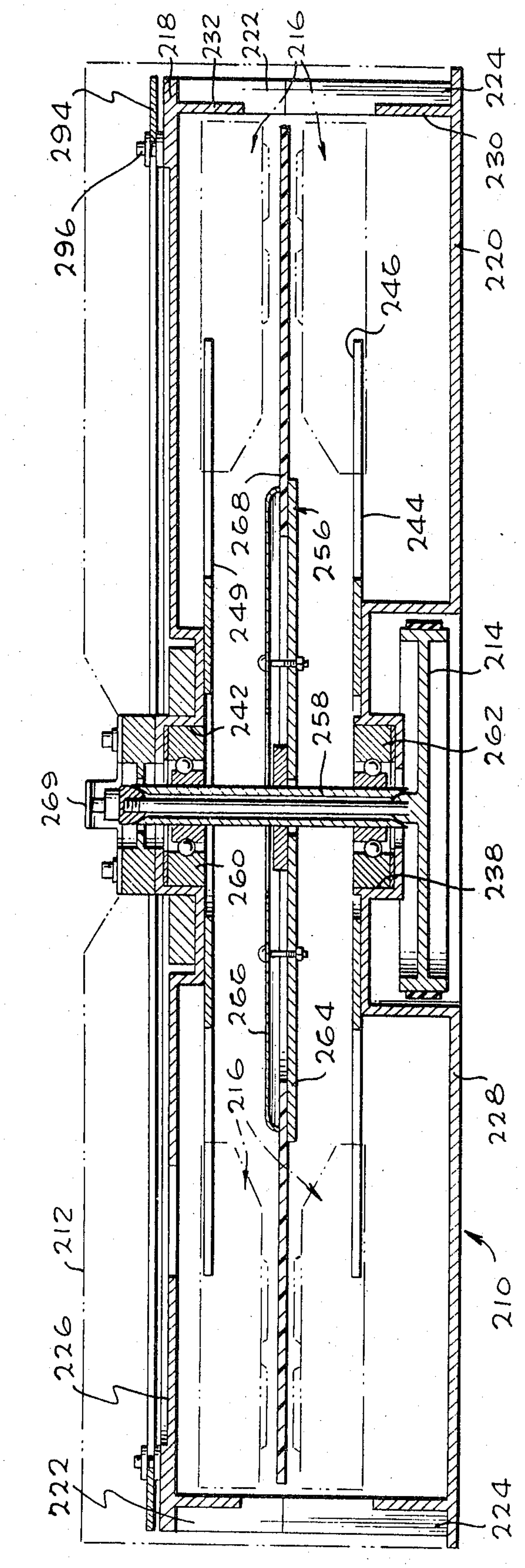
FIG. 13 is a cross sectional view of the module of FIG. 12 taken along the line 13—13.
Figure 14:
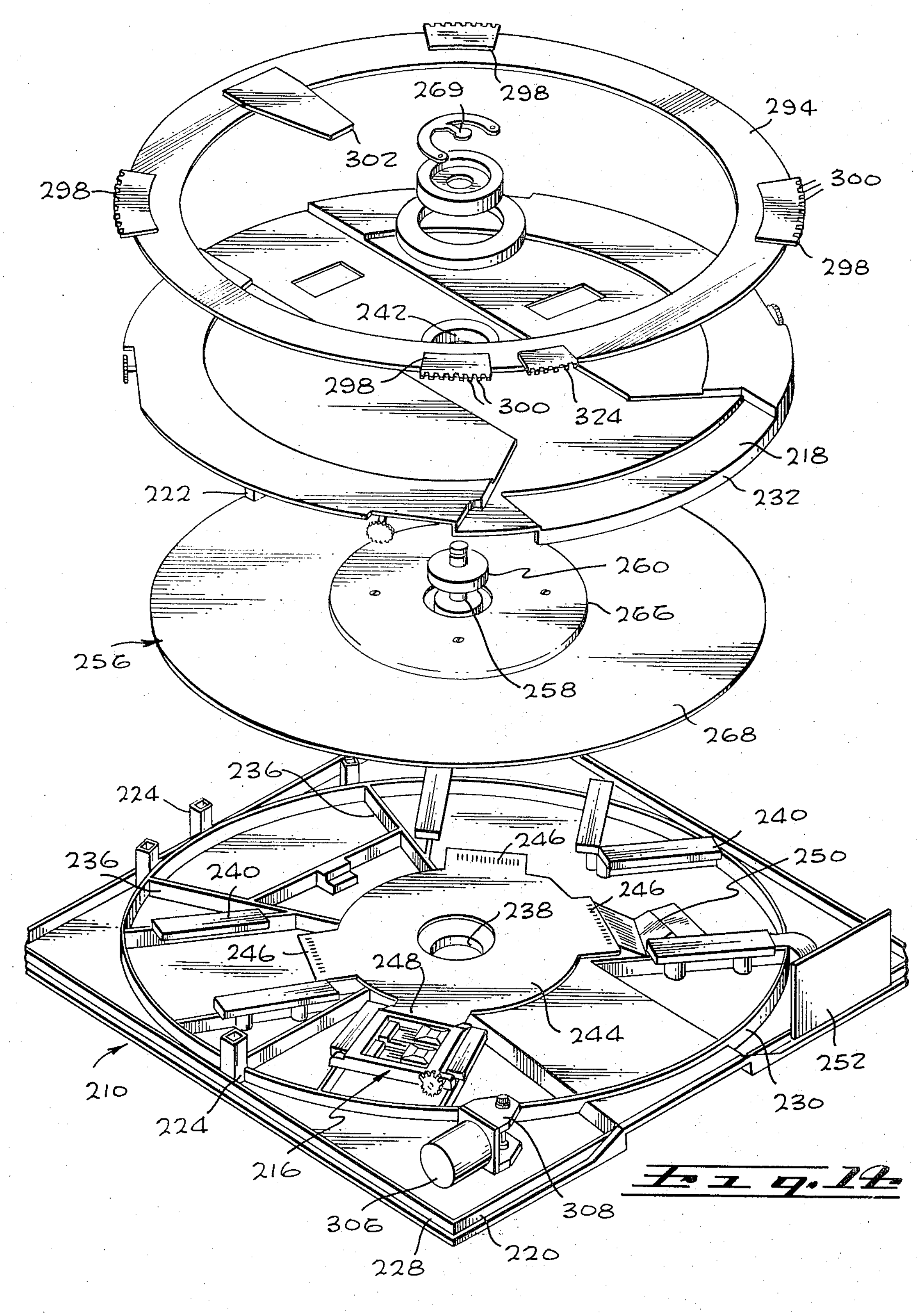
FIG. 14 is an exploded perspective view of the principal operative elements of the module of FIG. 12.

An alternative form of a disk module in accordance with the invention is shown in FIGS. 12–14. As so shown the alternative disk module 210 according to the invention is similar to the module 10 of FIGS. 1–5 in certain respects including the presence of a generally rectangular housing 212 so that the module 210 may be readily received by the guideways 19 for slidable insertion into the carrier 17 of the frame 12 shown in FIG. 1 and the presence of a driven pulley 214 (FIG. 13) for engagement by the drive belt 24 so as to be rotatably driven by the drive pulley 21 or 22 of the motor 20. Unlike the module 10 in which the driven pulley 55 is mounted at the top side thereof, the pulley 214 of the module 210 is mounted at the under side, requiring that the motor 20 of the arrangement of FIG. 1 be so located within the frame 12 that the drive pulleys 21 and 22 thereof are aligned with the driven pulley 214 when modules 210 are inserted within the frame 12.

Figure 16:
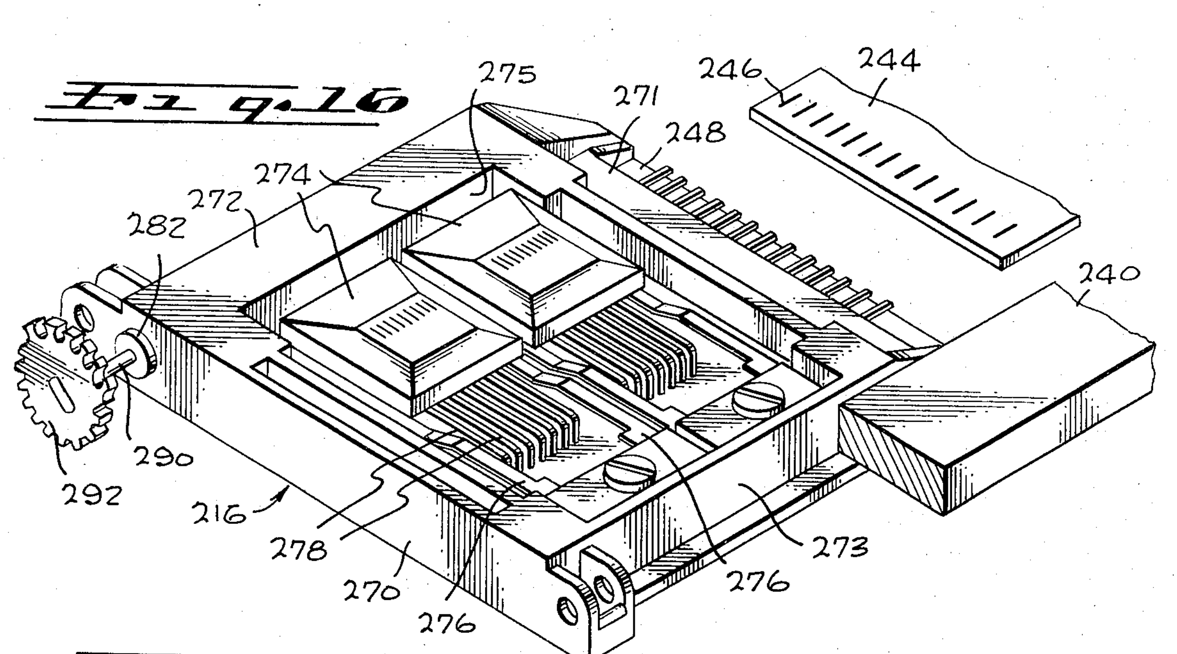
FIG. 16 is a perspective view of a head mounting module for use in the module of FIG. 12.
Figures 17, 18, 19:
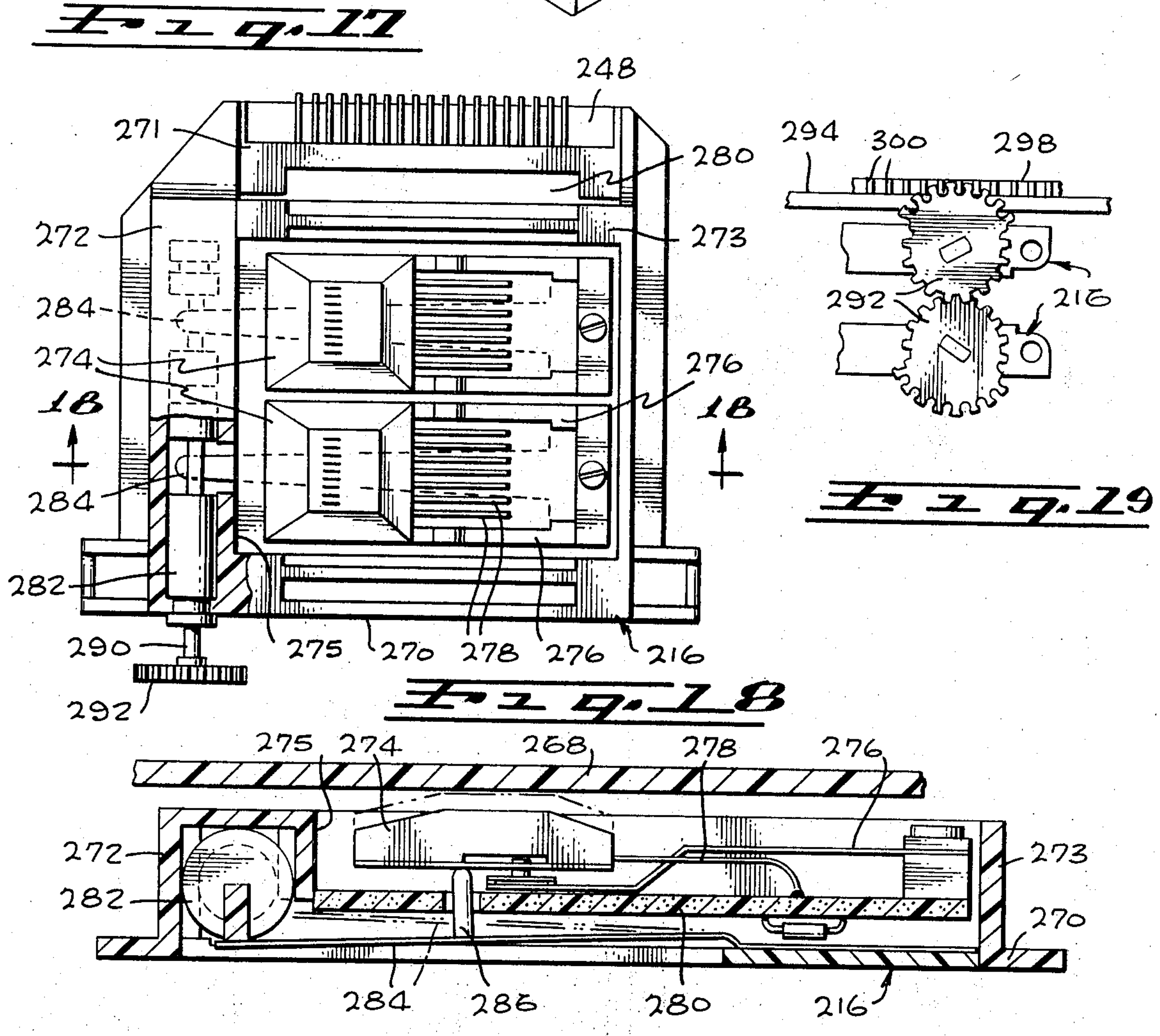
FIG. 17 is a plan view of the head mounting module of FIG. 16.
FIG. 18 is a sectional view of the head mounting module of FIG. 16 taken along the line 18—18 of FIG. 17.
FIG. 19 is a side view of the gearing arrangement for operating the head mounting module of FIG. 16.

The disk module 210 of FIGS. 12–14 is simpler in its construction than is the module 10 of FIGS. 1–5 and employs a different head mounting module 216 shown in FIGS. 16–18 as well as a different arrangement for lowering and raising the air-bearing head pads of the head modules 216. Aside from the rectangular housing 212, the disk module 210 is basically comprised of but two mating members 218 and 220. The upper or cover member 218 which is planar and generally disk shaped or of circular configuration has a plurality of downwardly extending lugs 222 spaced about the outer periphery thereof which mate with and are fastened to a plurality of upwardly extending lugs 224 integrally formed with the lower member 220 so as to define a hollow, low profile cylindrical shell 226. The lower or base member 220 is generally flat or planar and rectangular in shape so as to extend beyond the cylindrical shell 226 and define a bottom or base 228 for the module 210. The outer edges of the base 228 are adapted to receive the housing 212 so as to define the generally rectangular external configuration of the disk module 210.

As best seen in FIG. 14 the lower member 220 includes a circular rim 230 the same size as a circular rim 232 at the outer periphery of the upper member 218. The circular rim 230 together with the included portion of the lower member 220 defines the lower portion of the low profile cylindrical shell 226, while the upper member 218 and its included circular rim 232 defines the upper portion of the cylindrical shell 226. The lugs 224 extend upwardly from the rim 230 of the lower member 220, while the lugs 222 extend downwardly from the rim 232 of the upper member 218. The circular rims 230 and 232 together with the lugs 222 and 224 at the outer rim of and defining the low profile cylindrical shell 226 provide a plurality of radial openings 234 which allow access to the inside of the shell 226 for insertion of the head mounting modules 216 described hereafter. The lower member 220 also includes a plurality of ridges 236 which extend generally radially outwardly from a bearing receiving aperture 238 to the circular rim 230 to define a plurality of spokes.

Accordingly the upper and lower members 218 and 220 of the disk module 210 define an opposing pair of wheel members in the fashion of the module 10 of FIGS. 1–5. However because of a slightly different mounting arrangement for the head modules as well as a different arrangement for raising and lowering the air-bearing pads of the head modules, the wheel members of the module 210 comprise a part of the integrally formed upper and lower members 218 and 220 with the members 218 and 220 forming not only the low profile cylindrical shell 226 but also substantially the entire superstructure of the module 210.

As best shown in FIG. 14 a plurality of elongated guideway elements 240 are mounted on the upper and lower members 218 and 220 to define separate positions for the head modules 216. The present example is like that of the module 10 of FIGS. 1–5 in that four of the head modules 216 are mounted on each side of the magnetic disk arrangement. Radial positioning of the head modules 216 relative to the magnetic disk assembly is defined by a pair of central plates in the form of printed circuit boards mounted in the region of the aperture 238 of the lower member 220 and a central aperture 242 in the upper member 218. A central plate forming a head lead buss 244 associated with the lower member 220 is shown in FIG. 14. The head lead buss 244 is provided with four different female connectors 246 at the ends of each of the four head module positions. Each of the head modules 216 is installed by engaging the opposite sides of the head module with the opposite guideway elements 240 and sliding the head module radially inwardly until a male connector 248 at the inner end thereof plugs into the female connector 246. With the connectors 246 and 248 so engaged the various magnetic heads of the head module 216 are electrically coupled to the female connector 246, and at the same time the head module is properly positioned radially for interaction with the magnetic disk assembly. The head modules 216 which are mounted on the upper member 218 are similarly positioned and connected using a central plate 249 (FIG. 13) with female connectors.

The various conductors on the printed circuit board comprising the head lead buss 244 are coupled via internal signal lines 250 to a connector 252 at the rear wall of the disk module 210. The rear wall connector 252 is also coupled via internal signal lines 254 as shown in FIG. 12 to the printed circuit board comprising the head lead bus 249 of the upper member 218. In this fashion as each of the head modules 216 is installed the various magnetic heads thereof are electrically coupled to the rear wall connector 252. When the disk module 210 is installed in the frame 12 of FIG. 1, the rear wall connector 252 couples with a mating connector so as to couple the various magnetic heads to he systems electronics in the fashion described in connection with the module 10 of FIGS. 1–5.

A magnetic disk assembly 256 disposed between the mating upper and lower members 218 and 220 is mounted on a central drive shaft 258 the lower end of which mounts the driven pulley 214. The shaft 258 and included magnetic disk assembly 256 are mounted for rotation between the members 218 and 220 by upper and lower bearings 260 and 262 respectively received within the apertures 242 and 238. The magnetic disk assembly 256 includes a disk hub 264 mounted on the drive shaft 258 and an annular flat disk clamp 266 for clamping a magnetic disk 268 to the disk hub 264. The disk module 210 utilizes the opposite sides of the single magnetic disk 268 for reasons of design choice and convenience, although a pair of magnetic disks arranged as in the case of the disk module 10 of FIGS. 1–5 can alternatively be used. A spindle guard contact 269 mounted on the upper member 218 and disposed over and in contact with a ground button on the top end of the shaft 258 dissipates any static charge which is built up and which might otherwise collect on the disk 268.

One of the head modules 216 is shown in FIGS. 16–18. The head module 216 includes a generally rectangular frame 270 having an insertable end 271 and a pair of substantially parallel side members 272 and 273 which define a hollow interior in which a pair of air-bearing head pad assemblies 274 reside. The head pad assemblies 274 are movable out of an opening 275 in the frame 270 for operative interaction with the magnetic disk 268. Each of the head pad assemblies 274 is mounted at one end of a spring arm assembly 276 having an opposite end mounted on the side member 273 of the frame 270. The spring arm assemblies 276 are flexible to permit movement of the head pad assemblies 274 through the opening 275 in the frame 270.

Figure 10:
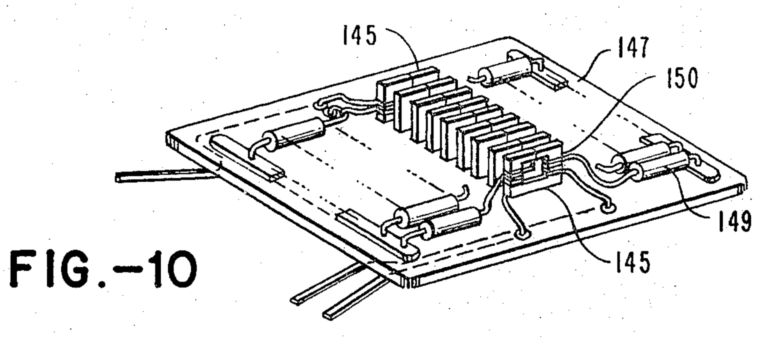
FIG. 10 is a perspective view showing a portion of FIG. 9 in greater detail.

The head pad assemblies 274 are constructed in a fashion similar to that shown in FIG. 10 so as to include a plurality of magnetic heads having coils which couple the heads through a matrix of diodes to a plurality of conductors in the form of a fret assembly 278. The individual leads of the fret assembly 278 which are capable of flexure as the head pad assemblies 274 are moved into and out of the opening 275 couple the various heads of the head pad assemblies 274 to a printed circuit board base 280 mounted on the frame 270. The circuit board base 280 couples the various leads of the fret assembly 278 and thus the individual heads of the head pad assemblies 274 to the male connector 248 at the insertable end 271 of the frame 270. As previously described the male connector 248 couples to a female connector 246 on one of the central plates to effect coupling of the magnetic heads via the rear wall connector 252 to the systems electronics.

Movement of the head pad assemblies 274 into and out of operative relationship with the magnetic disk 268 is accomplished by an assembly which includes a rotatable eccentric shaft 282 mounted at one end of the frame 270 within the side member 272 and engaging a pair of cantilevered members in the form of spring elements 284 mounted on the side member 273 of the frame 270 at the ends thereof opposite the shaft 282. As best seen in FIGS. 17 and 18 each of the spring elements 284 engages the shaft 282 at a region of the shaft which is offset from and thereby eccentric with respect to the central axis of rotation of the shaft. Accordingly rotation of the shaft 282 produces movement of the spring elements 284 toward and away from the opening 275 in the frame 270. Each of the spring elements 284 has a loading pin 286 (FIG. 18) mounted at a selected location along the length of the spring element for engaging with a loading region on the back of the head pad assembly 274. When the shaft 282 assumes a rotational position as shown in FIG. 18 so as to pull the spring elements 284 away from the opening 275, the resulting withdrawal of the loading pins 286 from the opening 275 allows the head pad assemblies 274 to move through the opening 275 to the inside of the frame 270 under the urging of the spring arm assemblies 276. The head pad assemblies 274 are therefore in a retracted position away from and out of operative relationship with the magnetic disk 268. The head pad assemblies 274 are caused to assume such a retracted or non-operative position when the magnetic disk 268 is at rest or is accelerating to normal operating speed. In order to land the head pad assemblies 274 on a thin film of air at the surface of the magnetic disk 268 so as to facilitate an operative or transducing relationship, the shaft 282 is rotated approximately 180° permitting the spring elements 284 to move toward the opening 275 as shown in phantom in FIG. 18. The loading pins 286 thereby force the head pad assemblies 274 out through the opening 275 and into operative relationship with the magnetic disk 268 as also shown in phantom in FIG. 18. The spring elements 284 are designed so as to urge the head pad assemblies 274 against the air film at the surface of the magnetic disk 268 with a selected amount of force.

As seen in FIG. 16 the rotatable shaft 282 extends to the outside of the frame 270 where it is coupled to a shaft 290 having a gear 292 coupled to the outer end thereof. Rotation of the gear 292 therefore results in movement of the head pad assemblies 274 into and out of their operative positions. As shown in FIG. 19 as well as in FIG. 12 the gears 292 of the head modules 216 mounted on the lower member 220 are engaged by the gears 292 of corresponding head modules 216 mounted on the upper member 218 so that when the gears 292 in the head modules of the upper member 218 are rotated the gears 292 associated with head modules on the lower member 220 are also rotated. The gears 292 of the head modules 216 mounted on the upper member 218 are rotated by a head shifting ring 294 mounted for rotation at the top of the upper member 218 by a plurality of guides 296. Four separate gear segments 298 are mounted on the ring 294 so as to present teeth 300 along selected arcs at the outer periphery of the ring 294 for engagement with the gears 292 of the head modules 216 mounted to the upper member 218. Thus when the ring 294 is moved in one direction to a limit of motion the gears 292 of all of the head modules 216 are rotated through the arc of movement necessary to move all of the head pad assemblies 274 into operative positions relative to the magnetic disk 268. Conversely when the ring 294 is rotated in the opposite direction to an opposite limit of motion, the gears 292 are rotated approximately 180° so as to move all of the head pad assemblies 274 away from the operative positions thereof and into the inoperative positions. At the same time as the head pad assemblies 274 are being moved into the operative or inoperative positions a tab 302 mounted on and extending inwardly from the head shifting ring 294 engages a head assembly 304 mounted in the upper member 218 so as to move the heads thereof into and out of operative positions with respect to a plurality of clocking tracks on the magnetic disk 268.

Figure 15:
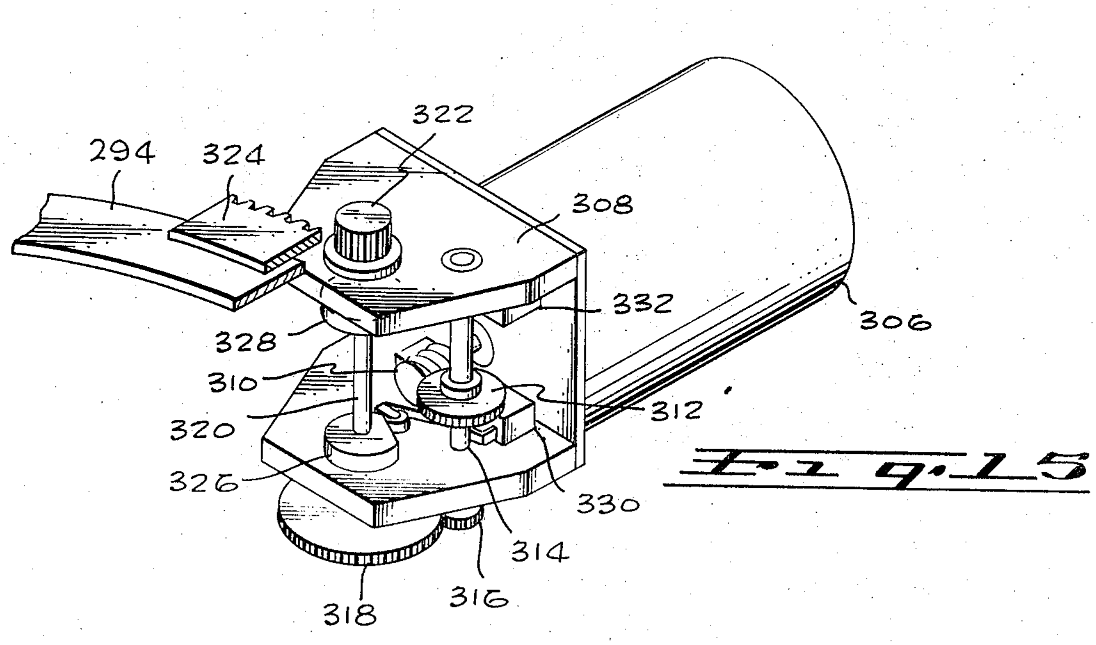
FIG. 15 is a perspective view of a motor and gear assembly for controlling the head mounting modules of the module of FIG. 12.

FIG. 15 shows a motor and gear arrangement for selectively driving the head shifting ring 294 and which is mounted on the lower member 220 at a rear corner thereof opposite the rear wall connector 252. The assembly includes a motor 306 mounted on a gear bracket 308 and having the toothed shaft 310 thereof engaged with a gear 312 mounted on a shaft 314. As the motor shaft 310 rotates, the gear 312 is driven so as to rotate the shaft 314 which is rotatably mounted in the gear bracket 308 and a gear 316 which is also mounted on the shaft 314. The gear 316 drives a substantially larger gear 318 mounted on the end of a shaft 320 which is rotatably mounted on the gear bracket 308 and which has a gear 322 at the opposite end thereof. The gear 322 remains in constant engagement with a fifth toothed gear segment 324 mounted on the head shifting ring 294. The gears 316 and 318 perform a gear reduction function as the motor 306 drives the gear 322 so as to rotate the head shifting ring 294 and thereby selectively effect movement of the head pad assemblies 274 into and out of their operative positions. The shaft 320 includes a pair of eccentric disks 326 and 328 respectively engaged by a pair of microswitches 330 and 332. When the shaft 320 has rotated far enough to cause movement of the head pad assemblies 274 into one of their opposite positions the disk 326 actuates the associated microswitch 330 to stop the motor 306. Conversely when the shaft 320 has been rotated in the opposite direction far enough to move the head pad assemblies 274 into their opposite positions, the eccentric disk 328 actuates the associated microswitch 332 to stop the motor 306.

The motor 306 is preferably powered by one or more batteries of relatively long life so as to function independently of the main power system and to insure that the head pad assemblies are moved out of their operative positions in the event of a failure of the main power source.

In operation the magnetic disk 268 is typically accelerated from rest to a normal operating speed on the order of 3,600 rpm or greater. The head pad assemblies 274 are preferably moved into their operative positions when the magnetic disk 268 is traveling fast enough to sustain an air bearing but not so fast that turbulence interferes with proper landing of the head pad assemblies. In a typical example where the magnetic disk 268 is operated at a speed of 3,600 rpm for normal operation the head pad assemblies 274 are landed and unlanded at one half the normal operating speed or 1,800 rpm. As the disk 268 is accelerated from rest the speed sensor mechanism 47 shown in FIG. 1 monitors the speed of the disk. When a speed of approximately 1,800 rpm is reached the head loading control mechanism 49, also shown in FIG. 1, energizes the motor 306 to commence movement of the head pad assemblies 274 into their operative positions. This is accomplished as previously described by rotation of the head shifting ring 294 so as to rotate the gears 292 and thereby the various shafts 282 of the head modules 216. When the head shifting ring 294 has been rotated far enough to effect landing of the head pad assemblies 274 the eccentric disk 326 actuates the associated microswitch 330 to turn off the motor 306. At the same time the disk 268 continues to accelerate until normal operating speed is reached. When the disk 268 is decelerated to rest, either intentionally or by reason of failure of the main power supply, the speed sensor mechanism 47 senses when the disk has slowed to 1,800 rpm. At this point the head control mechanism 49 energizes the motor 306 to commece rotating the head shifting ring 294 in the opposite direction so as to move the head pad assemblies 274 into the inoperative position. When this position has been reached the eccentric disk 328 actuates the microswitch 332 to turn off the motor 306.

Although there have been described above and illustrated in the drawings various forms of modular disk file systems and various combinations of elements therefor, it will be appreciated that other modifications and variations are feasible within the scope of the appended claims.

What is claimed is:

1. A head per track disk file system comprising:

a pair of spoked wheel members mounted about a central axis and having abutting rim elements defining a low profile cylinder having a peripheral rim;

central shaft means rotatably mounted along said central axis in each of said spoked wheel members;

at least one magnetic disk means mounted on said shaft means in a central region therealong between the wheel members and normal to the central axis;

a pair of generally flat head support means, each disposed adjacent and parallel to a different one of said wheel members on the opposite side from said disk means and substantially parallel thereto;

and magnetic head assembly means mounted on each of said head support means and extending through spaces between the spokes of said wheel members into operative relation with the adjacent face of said disk means.

2. The invention as set forth in claim 1 above, wherein said wheel members include radial openings in the peripheral rim, and wherein said head assembly means are radially insertable through said openings.

3. The invention as set forth in claim 1 above, wherein the head assembly means comprise air bearing heads, and wherein said system further includes head loading mechanisms mounted on said head support means and mechanically displaceable means engaging said loading mechanisms for urging said head assembly means toward the associated disk means.

4. The invention as set forth in claim 3 above, wherein said mechanically displaceable means comprises generally disk shaped means mechanically displaceable through a selected arc relative to the central axis, and wherein said head loading mechanisms comprise cam means, and wherein said head support means includes guide means for receiving said head assembly means.

5. A modular magnetic disk assembly comprising:

a frame structure;

a single drive motor coupled to said frame structure and having extending drive means;

at least one disk module slidably supported in said frame structure and including at least one disk lying in a plane normal to a central axis, said axis being substantially parallel to the rotational axis of said drive motor, said disk module including:

a cylindrical support structure having a hollow interior and disposed about the central axis;

disk shaft means rotatably mounted within said support structure about the central axis;

disk means mounted on said disk shaft means in a central region thereof;

driven pulley means mounted at one end of said disk shaft means; and drive belt means coupling the drive means to said driven pulley means;

said cylindrical support structure comprising frame means defined by a pair of wheel members concentric with the central axis, each having a central hub, an outer rim and radial arms extending therebetween, said pair of wheel members being disposed with the outer rims in abutting relation to define a low height cylindrical structure having a hollow interior, said disk shaft means being rotatably mounted within the center hubs and said disk means rotating within the hollow interior of said cylinder.

6. The invention as set forth in claim 5 above, wherein said cylindrical support structure includes radial peripheral apertures for receiving magnetic head assemblies, and wherein said disk module further includes at least a pair of head support members, each being mounted on an opposite side of a different one of said wheel members, and including guide elements for slidably receiving magnetic head assemblies radially insertable through the peripheral openings.

7. The invention as set forth in claim 6 above, wherein said head assemblies comprise air bearing magnetic head assemblies including a frame for engaging in sliding relation with the receiving guideways, and a spring mounted air bearing pad including magnetic head elements, said head assembly having a loading point for being urged into engagement with said disk means, and wherein said combination further includes cam means mounted on the opposite side of said head assemblies from said disk means and in engagement with each of said head assemblies at the loading point thereof, for selectively loading said head assemblies.

8. The invention as set forth in claim 7 above, wherein said cam means comprises a number of cam members, each slidably movable on the head support means on the opposite side thereof from a different associated head assembly; and a control plate concentric with said central axis and substantially parallel to said disk means, said control plate engaging said cam means and being movable through a selected circumferential arc.

9. In a magnetic disk file system, the combination comprising:

a frame encompassing the magnetic disk, said frame including radial openings accessing to the disk, and guideway means along said radial openings;

a plurality of head modules, each having at least one spring loaded head pad including a loading region thereon, each of said head modules being receivable in a radial opening in said frame;

a centrally disposed plug assembly disposed within said frame and coupling to at least one of said modules when inserted; and means coupled to said frame and in operative association with said head modules for selectively applying a loading force on the loading region thereof, to urge the head pads toward the recording disk.

10. A magnetic disk file system having interchangeable head modules in a head per track configuration and comprising:

a frame structure including and supporting a disk means, said frame structure being generally concentric with said disk means and including a plurality of module receiving openings for the insertion of head modules on opposite sides of said disk means;

a plurality of magnetic head modules, each having at least one spring loaded head pad having a loading region thereon on the opposite side from the disk surface with which it is to be associated, each of said head modules being receivable into a different radial opening of said frame, and each including a multi-pin connector at the inserted end thereof;

centrally disposed circuit board means within said frame, said circuit board means including a plurality of connector elements, each for operatively engaging a different inserted head module;

means coupling said central circuit board means to an output terminal;

and means disposed within said frame structure for selectively engaging the loading regions of said inserted head modules concurrently, to urge the head pads toward the associated recording surfaces of the disks concurrently.

11. The invention as set forth in claim 10 above, wherein said head modules each have a pair of spring loaded head pads, wherein said frame includes guideway means for guiding a different plurality of head modules into position relative to opposite recording surfaces of said disk means; wherein said central circuit board assembly comprises a different pair of circuit boards, each on a different side of said disk means, wherein said central circuit board means has end male plug assemblies, and wherein said head modules have female connector elements for receiving said male plug assemblies when inserted.

12. A flying head assembly for magnetic recording comprising:

a substantially hollow frame structure having an insertable end and substantially parallel side members;

a spring mount coupled at one end to one side member of said frame;

a head pad assembly coupled to the free end of said spring mount in the interior opening of said frame;

a plurality of resilient conductive elements coupled to said head pad and coupled to the opposite side arm of said frame;

a cantilever member mounted at one side arm of said frame and extending adjacent said head pad; and loading pin means reciprocally movable in said cantilevered member and engaging said head pad.

13. The invention as set forth in claim 12 above, including in addition multi-pin connector means mounted in the insertable edge end of said frame, and circuit means interconnecting said elongated conductive members to said connector means.

14. The invention as set forth in claim 13 above, wherein said module comprises a pair of spring mounts in spaced apart relation on one side of one side arm; a pair of head pads disposed in the central interior region of said frame; a pair of sets of elongated conductive elements of beryllium copper material, each set of conductive elements coupling a different head pad to the multi-pin connector means.

15. In a non-contact recording system in which a plurality of heat assemblies are mounted around a frame adjacent an associated recording member, each of the head assemblies having a movable head pad mounted on a spring mechanism normally out of engagement with the associated recording member, and the head pad is to be urged in a normal direction relative to the recording member, a control system comprising:

spring means mounted in fixed relation relative to said head pad;

a cam follower member coupled to said spring means and movable in a direction normal to said recording member;

generally disk-shaped cam means shiftable in a direction substantially parallel to said recording member, and in engagement with said cam follower means; and means engaging said cam means for controlling the shifting thereof in a plane parallel to said recording surface.

16. The invention as set forth in claim 15 above, including in addition a substantially planar head support means for supporting said head pad, said spring means being mounted on said head support means on the side adjacent said head pad, said camming means being mounted on the head support means on the side opposite said head support pad.

17. The invention as set forth in claim 15 above, wherein said camming means comprises a longitudinally slidable cam member having an inclined cam surface receiving said cam follower, slidably movable on said head support means, and wherein said means for effecting shifting comprises a control disk movable through a selected arc, and mounted substantially parallel to said head support means and in proximate relation thereto.

18. A flying magnetic head assembly for head per track systems comprising:

a ceramic air bearing shoe;

a multi-channel head assembly coupled to said shoe and including coil means coupled to each head;

a printed circuit board coupled to and mounting the head assembly and including conductor means coupled to each coil means;

a plurality of spring elements extending outwardly from the printed circuit board plane and coupled to a base surface; at least some of the spring elements comprising electric conductors coupled to said conductor means; and center positioned mechanical loading means acting against said assembly.

19. A magnetic disk module for use in a head per track disk file system, comprising:

a pair of frame members mounted about a central axis and having abutting rim elements defining a low profile housing;

central shaft means rotatably mounted along said central axis in each of said frame members;

at least one magnetic disk means mounted on said shaft means in a central region therealong between the frame members and normal to the central axis;

a plurality of magnetic head assemblies mounted in the region of the frame members and adjacent the magnetic disk means;

means including at least one member rotatable relative to said central axis and coupled to the magnetic head assemblies for selectively moving the head assemblies into and out of operative transducing positions relative to the magnetic disk means in response to rotation of said at least one member; and means for selectively rotating said at least one member.

20. In a magnetic disk file system, the combination comprising:

a frame encompassing the magnetic disk, said frame including radial openings in the outer edges thereof accessing to the disk;

a plurality of head modules, each having at least one spring loaded head pad including a loading region thereon, each of said head modules being receivable in a radial opening in said frame;

central plug assembly means electrically coupling to each of said modules when the modules are disposed within the radial openings in the frame; and means coupled to said frame and in operative association with said head modules for selectively applying a loading force on the loading region thereof, to urge the head pads toward the recording disk.

21. A flying head assembly for magnetic recording comprising:

a frame structure having an insertable end, opposite side members and a substantially hollow interior;

at least one spring mount having a portion thereof coupled to the frame structure, said spring mount extending at least partly into the hollow interior and having a free end opposite the coupled portion thereof;

at least one head pad assembly coupled to the free end of said spring mount and including at least one magnetic head;

electrical coupling means mounted on the frame structure and coupled to the at least one magnetic head; and means for engaging the head pad assembly to selectively move the head pad assembly between an inoperative position within the frame structure and an operative position outside the frame structure.

22. A modular disk file system comprising:

at least one disk module comprising a housing having at least one magnetic disk and a plurality of magnetic head modules mounted therein; and a frame structure having at least one slot therein for receiving the disk module, said slot having a shape similar to and a size slightly larger than the housing of the disk module and guideways for slidably receiving the disk module therein and for permitting removal of the disk module from the frame structure, the frame structure being absent a magnetic disk except when a disk module is received therein and including circuitry for controlling a transducing operation in conjunction with the magnetic disk within the disk module and means for controlling movement of the magnetic head modules within the disk module relative to the magnetic disk.

23. The invention as set forth in claim 22 above, wherein the frame structure includes a plurality of slots for receiving a plurality of the disk modules.

24. The invention as set forth in claim 22 above, wherein the frame structure includes a single drive motor driving at least one drive pulley having a belt coupled thereto, and the disk module includes a driven pulley capable of being coupled to the belt to drive the magnetic disk when the disk module is received within the frame structure.

25. A modular disk file system comprising:

a frame structure having means for releasably receiving at least one disk module; and at least one magnetic disk module having at least one magnetic disk, a plurality of magnetic heads mounted adjacent the magnetic disk and means for selectively moving the magnetic heads into or out of an operative position relative to the magnetic disk;

the frame structure including circuitry for controlling a transducing operation in conjunction with the magnetic disk, the circuitry including means coupling to the magnetic disk module when the disk module is received by the frame structure for controlling movement of the magnetic heads and means coupling the circuitry to the magnetic heads when the disk module is received by the frame structure.

26. A magnetic disk file system comprising:

frame means defining a hollow, low profile cylinder;

at least one magnetic disk assembly rotatably mounted within the cylinder;

a plurality of magnetic head modules mounted within the cylinder on opposite sides of the magnetic disk assembly, each of the head modules including at least one flying head pad and rotatable means for moving the flying head pad between an inoperative position away from the magnetic disk assembly and an operative position adjacent the magnetic disk assembly when rotated; and a common head control element rotatably mounted on the cylinder and having an outer periphery disposed adjacent the head modules and engaging the rotatable means in each of the head modules, the common head control element being operative to move the flying head pads between the inoperative and operative positions in response to rotation thereof.

27. The invention as set forth in claim 26 above, wherein the magnetic head modules are arranged into pairs with the individual modules of each pair being disposed on opposite sides of the magnetic disk assembly, the common head control element has a plurality of toothed segments spaced along the outer edge thereof, and the individual modules of each pair include a first gear mounted on the rotatable means of one head module of the pair and engaged with one of the toothed segments and a second gear mounted on the rotatable means of the other head module of the pair and engaged with the first gear.

28. The invention as set forth in claim 27 above, further including a motor, a gear assembly coupling the motor to rotate the common head control element, and first and second switching means for stopping the motor when the common head control element has been rotated to either of two opposite positions.

29. A magnetic disk file system comprising:

a generally planar base member having a circular portion defining the lower portion of a hollow, low profile cylinder;

a generally planar cover member of generally circular configuration mounted on the base member and defining the upper portion of the hollow, low profile cylinder;

a central shaft rotatably mounted within the cylinder;

at least one magnetic disk mounted on the central shaft in generally parallel relation to the base and cover members for rotation within the cylinder;

at least one magnetic head module mounted on the planar base member and including at least one flying head pad selectively movable into the region of the magnetic disk adjacent one side of the disk;

at least one magnetic head module mounted on the cover member and including at least one flying head pad selectively movable into the region of the magnetic disk adjacent the side of the disk opposite said one side; and means coupled to the magnetic head modules for simultaneously moving the flying head pads into and out of the region of the magnetic disk.

30. The invention as set forth in claim 29 above, further including common electrical coupling means mounted on the base member and electrically coupled to each of the flying head pads.

31. The invention as set forth in claim 29 above, wherein the base member and the cover member define radial openings in the low profile cylinder, and the head modules are radially insertable through the openings for mounting on the base member and the cover member.

32. A flying head assembly for magnetic recording comprising:

a generally rectangular frame structure having a hollow central portion;

a head pad assembly mounted on the frame structure and movable relative thereto, the head pad assembly residing generally within the hollow central portion of the frame structure;

a resilient element having one end thereof mounted on the frame structure and a central portion thereof engaged with the head pad assembly for moving the head pad assembly in response to movement thereof, the resilient element normally urging the head pad assembly in a direction out of the hollow central portion of the frame structure; and eccentric means rotatably mounted on the frame structure and in contact with the end of the resilient element opposite said one end, the resilient element being restrained from urging the head pad assembly in a direction out of the hollow central portion of the frame structure in varying degrees depending on the rotational position of the eccentric means.

33. The invention as set forth in claim 32 above, wherein the head pad assembly is mounted on the frame structure by a spring assembly which normally biases the head pad assembly into a position within the frame structure, and the resilient element is normally biased in the direction of the head pad assembly so as to force the head pad assembly into a position outside the frame structure when the eccentric means is rotated so as to permit movement of the resilient element toward the head pad assembly.

34. The invention as set forth in claim 32 above, further including electrical coupling means mounted on the frame structure at one end thereof, printed circuit board means mounted on the frame structure and electrically coupled to the electrical coupling means, and means electrically coupling the printed circuit board means to the head pad assembly.

* * * * *